Figure 1:
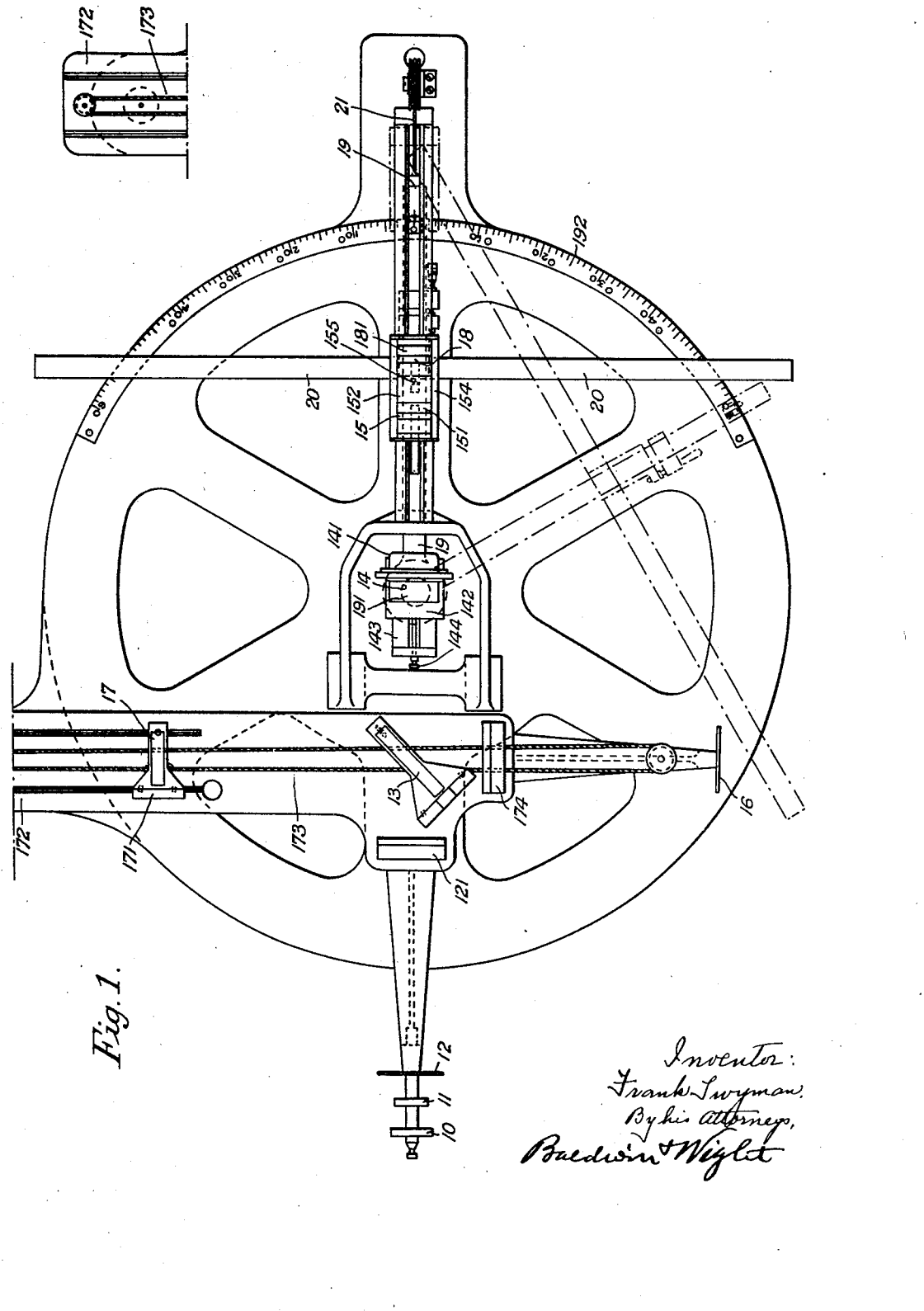

F. TWYMAN.
APPARATUS FOR TESTING LENSES.
APPLICATION FILED APR. 23, 1919.

1,347,133.

Patented July 20, 1920.
4 SHEETS—SHEET 2.

F. TWYMAN.
APPARATUS FOR TESTING LENSES.
APPLICATION FILED APR. 23, 1919.

1,347,133.

Patented July 20, 1920.
4 SHEETS—SHEET 3.

F. TWYMAN.
APPARATUS FOR TESTING LENSES.
APPLICATION FILED APR. 23, 1919.
1,347,133.
Patented July 20, 1920.
4 SHEETS—SHEET 4.
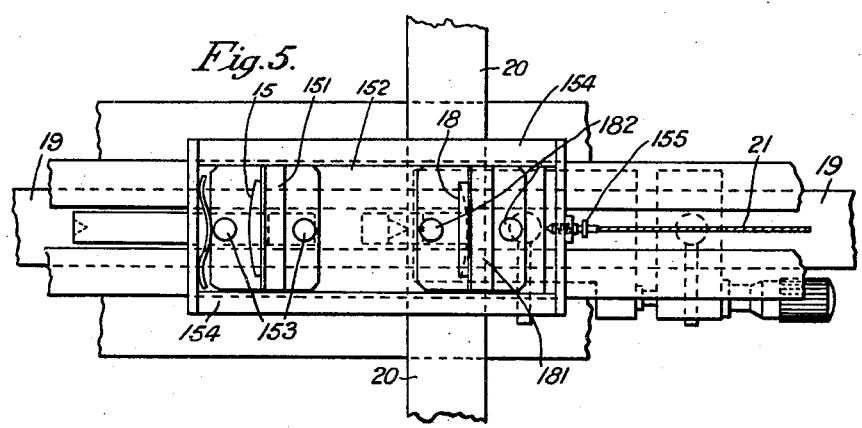
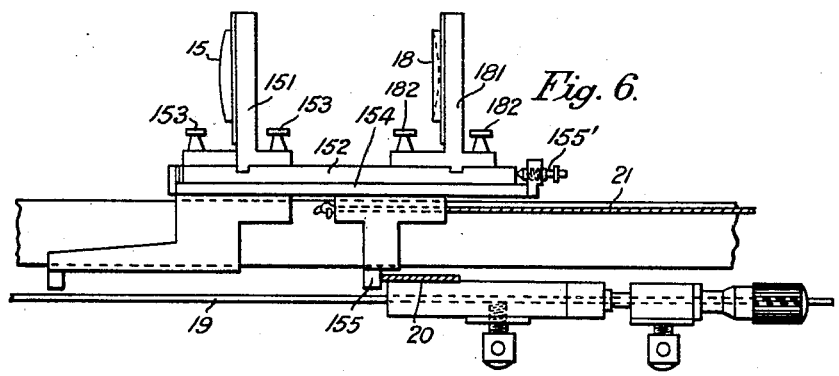
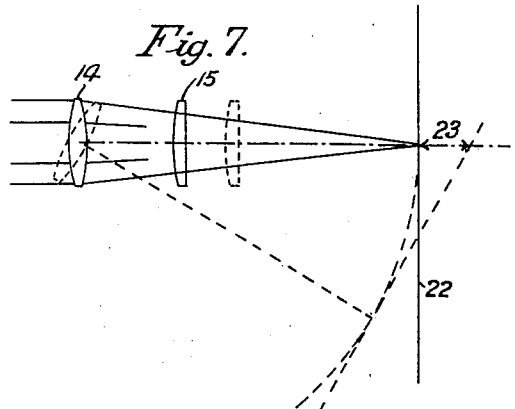
Inventor:
Frank Twyman,
By his attorneys,

UNITED STATES PATENT OFFICE.

FRANK TWYMAN, OF LONDON, ENGLAND, ASSIGNOR TO ADAM HILGER, LIMITED, OF LONDON, ENGLAND.

APPARATUS FOR TESTING LENSES.

1,347,133.   Specification of Letters Patent.   Patented July 20, 1920.

Original application filed February 4, 1919, Serial No. 274,843. Divided and this application filed April 23, 1919. Serial No. 292,042.

*To all whom it may concern:*

Be it known that I, FRANK TWYMAN, a subject of the King of Great Britain, residing at 75ª Camden road, London, England, have invented a new and useful Improved Apparatus for Testing Lenses, of which the following is a specification.

The application for this patent is a division of my application for United States patent, Serial No. 274,843, filed 4th February, 1919.

This invention relates to improvements in the apparatus for use in the process of testing lenses, described in the specification of the former application, Serial No. 274,843.

According to this invention, the lens is tested and corrected not only for beams of light entering the lens in an axial direction, but also for beams entering in oblique directions. The lens may be first tested and corrected for axial beams and subsequently tested and corrected for oblique beams. Or, since the correction for axial beams has effect on the oblique beams and vice versa, it is in practice simpler to make partial corrections for axial and oblique beams alternately until the greatest possible perfection is attained.

In an apparatus for carrying out this invention the lens is so mounted upon a carriage that its position can be adjusted both along and at right angles to its optical axis and the carriage can be turned about an axis at right angles to the optical axis of the lens. By adjustment of the lens the second nodal point of the lens can be positioned precisely in the axis about which the carriage turns.

The rotation of the carriage is effected by means of a rod which extends to the outer edge of the interferometer and is parallel to the axis of the lens, and a scale is provided so that the angle through which the lens is turned can be measured. Upon the rod and at right angles to it is mounted a bar whose distance from the axis of rotation of the lens can be adjusted, a scale being provided on the rod to enable the distance of the bar from the axis of rotation to be noted. The mirror (which may be either concave or convex) by which the light is reflected back through the lens is adjustably mounted on a carriage, and the carriage is automatically moved toward or away from the lens so that the center of curvature of the mirror is always in the focal plane in which the lens is supposed to form its image. In order to accomplish this a flexible connection is led from the carriage to a weight, and upon the carriage is a lug which is retained continually in contact with the bar above mentioned by the action of the weight.

Figure 2:
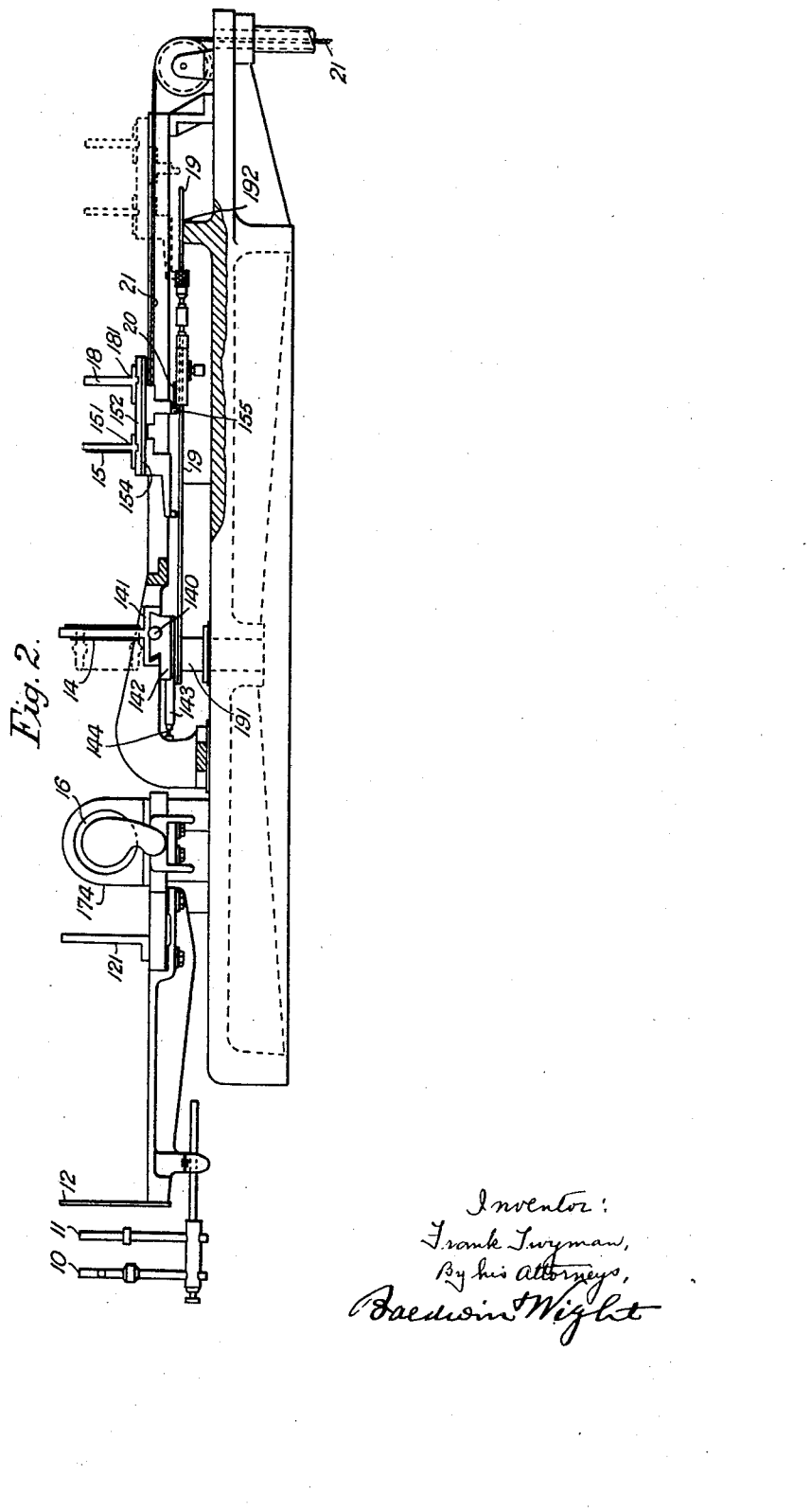
Figure 3:
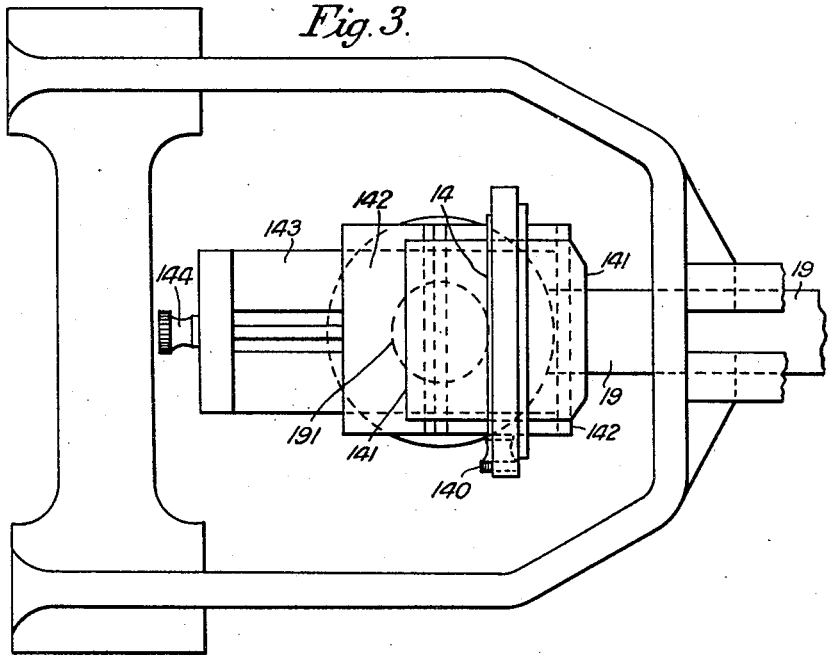
Figure 4:
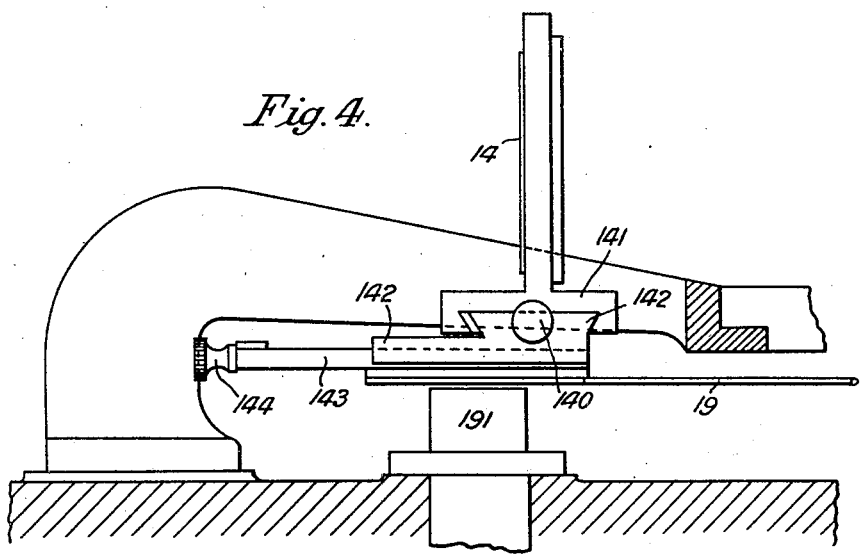

The annexed drawings show an apparatus made in accordance with this invention. Figure 1 is a plan, Fig. 2 a side elevation partly in section of the apparatus, and Figs. 3 and 4 are a plan and side elevation to a larger scale of the carriage upon which the lens is mounted. Figs. 5 and 6 are similar views to Figs. 3 and 4 of a carriage upon which the mirrors are mounted. Fig. 7 is a diagrammatic view showing a lens under test.

Light from a suitable source is reflected toward the apparatus by means of a mirror 10 and is condensed by a lens 11 on to the aperture of a diaphragm 12 through which it passes after being rendered parallel by a lens 121 to a plane parallel glass plate 13. The surface of the glass plate is partially silvered so that part of the light is reflected and part transmitted by it. The transmitted portion of the light passes to a lens 14 which is under test and 15 is a mirror by which the light is reflected back through the lens 14 to the plate 13 by which it is partly reflected toward the diaphragm 16 and forms an image of the aperture in the diaphragm 12. The other part of the beam passes to the mirror 17 from whence it is reflected back to the plate 13, part of the beam passing through the plate and combining with the beam that has passed through the lens 14.

The lens 14 is carried by a frame 141 free to move in a line at right angles to the optical axis of the lens upon a block 142 by means of a screw 140. The block 142 is mounted on a carriage 143 upon which it can be moved along the optical axis of the lens by means of a screw 144. The mirror 15 is mounted on a frame 151 capable of movement upon a plate 152 the frame 151 being clamped to the plate 152 by screws 153, see Figs. 5 and 6. The plate 152 is mounted on a carriage 154 and is capable of movement upon it and is held in position by a screw 155.

The carriage 143 is turned upon a pivot 191 by a rod 19 which extends to the outer edge of the apparatus over a scale 192 which indicates the number of degrees through which the rod is turned. When the carriage 143 is rotated on the pivot, the lens 14 is correspondingly rotated so that if originally the incident beam is parallel to the axis of the lens in its first position (such as the position shown in Fig. 1) the same beam will pass through the lens obliquely relatively to the lens when the lens is rotated. If the lens 14 were perfect all of the rays passing obliquely through the lens would travel in a direction parallel to the direction of travel before their incidence on the lens. In other words, the rays passing through a perfect lens obliquely thereto are not materially deflected from the direction of their travel except that the rays are brought to a focus. However, the focal plane of the lens moves away from the lens a distance proportionate to the angle through which it has been turned. Hence, since it is necessary in an apparatus of this kind that the focal plane of the lens corresponds to the center of curvature of the mirror it is necessary to move the mirror away from the lens a distance proportionate to the distance the focal plane of the lens is moved away from the lens, this distance being proportionate also to the angle of rotation of the lens. For effecting this movement of the mirror automatically, I use the apparatus hereinafter described.

At right angles to the rod 19 is adjustably secured a bar 20 and the carriage 154 is capable of sliding above the rod 19 and has attached to it by a flexible connection 21, a weight (not shown) which weight always tends to maintain a lug 155' upon the carriage 154 in contact with the bar 20. The mirror is in this way moved toward and away from the lens a distance corresponding to the angle of rotation of the latter, so that the center of curvature of the mirror is always in the plane in which it is desired that the lens should focus its images; to maintain the mirror in this focal plane it must be moved a distance equal to the distance marked 23 as is shown in Fig. 7. If the center of curvature of the mirror were not in the focal plane of the lens, i. e., in the plane in which it is desired that the foci of the various lenses should lie—then the reflected image would not fall in the same plane as the focal plane of the lenses and consequently even if a perfect lens were used a distortion would be apparent at the eye piece 16. By stating that it is desirable to so adjust the apparatus that the center of curvature corresponds with the focal plane of the lens, it is contemplated that the adjustment be originally made from a perfect lens and that other lenses be corrected from the adjustment thus first obtained. In full lines in this figure, 14 is the lens, 15 the mirror and 22 its focal plane in the case of an axial pencil, that is, to a position in which the incident beam is parallel to the axis of the lens; the dotted lines show the corresponding positions for an oblique pencil—i. e. a beam that passes through the lens obliquely relatively to the latter.

The mirror 17 is mounted on a carriage 171 moving in grooves 172 and actuated by means of cords 173. 174 is a lens through which the recombined beams from the mirrors 15 and 17 pass.

On the plate 152 is also mounted a frame 181 in which is another mirror 18, the frame 181 being clamped to the plate 152, by screws 182. The mirror 15 is convex and the mirror 18 is concave, the mirror 15 being removed when lenses of short focal length are being tested.

When it is desired to test a lens it is placed in the frame 141 on the carriage 143 and is so adjusted that the second principal point of the lens is positioned in the axis about which the carriage turns. The mirror is then suitably adjusted and the interference rings upon the lens are observed and the parts of the lens requiring polishing are either marked on the lens or on a map of the same. When the parts of the lens have been polished with a view to their partial removal the lens is again mounted upon the carriage and the rod 19 is turned so that the lens may be examined for oblique pencils, the interference rings are observed and the lens is partially treated to remove the same and is then alternately treated for axial and oblique pencils, until the desired accuracy is attained.

What I claim is:—

1. An apparatus for testing a lens comprising a plane parallel glass plate partially silvered and adapted to reflect part of a beam of light and to transmit a part, two mirrors adapted to reflect the light back to the plate and mounted so that their distances from the plate can be varied, a carriage adapted to adjustably receive the lens to be tested and maintain the same in the path of light to and from one of said mirrors, means for moving the lens on the carriage both along and at right angles to its optical axis and means for turning the carriage about an axis at right angles to the optical axis of the lens.

2. An apparatus for testing lenses comprising a plane parallel glass plate partially silvered and adapted to reflect part of a beam of light and to transmit a part, two mirrors adapted to reflect the light back to the plate and mounted so that their distances from the plate can be varied, a carriage adapted to receive the lens to be tested and maintain the same in the path of light to and from one of said mirrors, means for turning the carriage about an axis at right angles to the optical axis of the lens, and means for adjusting the mirror by which the light is reflected back through the lens, so that the center of curvature thereof is in the focal plane of the lens.

3. An apparatus for testing lenses comprising a plane parallel glass plate partially silvered and adapted to reflect part of a beam of light and to transmit a part, two mirrors adapted to reflect the light back to the plate and mounted so that their distances from the plate can be varied, a carriage adapted to receive the lens to be tested and maintain the same in the path of light to and from one of said mirrors, means for moving the lens on the carriage both along and at right angles to its optical axis, means for turning the carriage about an axis at right angles to the optical axis of the lens, and means for adjusting the mirror by which the light is reflected back through the lens, so that the center of curvature thereof is in the focal plane of the lens.

4. An apparatus for testing lenses comprising a plane parallel glass plate partially silvered and adapted to reflect part of a beam of light and to transmit a part, two mirrors adapted to reflect the light back to the plate and mounted so that their distances from the plate can be varied, a carriage adapted to receive the lens to be tested and maintain the same in the path of light to and from one of said mirrors, means for moving the lens on the carriage both along and about angles to its optical axis, a rod parallel to the optical axis of the lens, a bar mounted upon the rod at right angles to it, a carriage for one of the mirrors, and means for maintaining the carriage of said mirror by which the light is reflected back through the lens in contact with the bar.

5. An apparatus for testing lenses, comprising a member adapted to reflect part of a beam of light and transmit a part, two mirrors adapted to reflect the light back to said member, means for moving the mirrors toward and from said member, an adjustable carriage adapted to receive the lens to be tested and maintain the same in the path of light to and from one of said mirrors, means for moving said carriage in different directions with relation to the optical axis of the lens, and means for turning the carriage about an axis intersecting the optical axis of the lens.

In testimony that I claim the foregoing as my invention I have signed my name this first day of April, 1919.

FRANK TWYMAN.